United States Patent
Terai (10) Patent No.: US 10,815,846 B2
(45) Date of Patent: Oct. 27, 2020

(54) CONTINUOUSLY VARIABLE TRANSMISSION AND METHOD FOR CONTROLLING CONTINUOUSLY VARIABLE TRANSMISSION

(71) Applicant: NISSAN MOTOR CO., LTD., Yokohama-shi, Kanagawa (JP)

(72) Inventor: Hiromu Terai, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 16/462,604

(22) PCT Filed: Nov. 24, 2016

(86) PCT No.: PCT/JP2016/084828
§ 371 (c)(1),
(2) Date: May 21, 2019

(87) PCT Pub. No.: WO2018/096623
PCT Pub. Date: May 31, 2018

(65) Prior Publication Data
US 2020/0063613 A1    Feb. 27, 2020

(51) Int. Cl.
*F01M 1/16* (2006.01)
*F16H 7/02* (2006.01)
(Continued)

(52) U.S. Cl.
CPC .............. *F01M 1/16* (2013.01); *F16H 7/023* (2013.01); *F16H 57/0489* (2013.01); *F01M 2001/023* (2013.01)

(58) Field of Classification Search
CPC .......... F16H 61/66272; Y10T 477/624; F04B 2201/1201; F04B 2203/0209; F04B 49/20
(Continued)

(56) References Cited

U.S. PATENT DOCUMENTS 4,708,031 A * 11/1987 Morimoto ............. B60W 10/02
477/45
4,718,306 A * 1/1988 Shigematsu ........ B60W 10/107
192/106 F
4,962,678 A * 10/1990 Murano .................. F16H 59/72
474/22

(Continued)

FOREIGN PATENT DOCUMENTS

JP      2000-193075 A      7/2000
JP      2000-240782 A      9/2000
(Continued)

*Primary Examiner* — Henry Y Liu
(74) *Attorney, Agent, or Firm* — Foley & Lardner LLP (57) ABSTRACT

A method for controlling a continuously variable transmission is a control method for controlling in/out of oil to/from a primary oil chamber by using an oil pump provided in an oil passage between the primary oil chamber and a secondary oil chamber. The method for controlling the continuously variable transmission includes: a current command value calculation step of calculating a current command value for the oil pump in accordance with an operating state; a current limiting step of limiting the current command value to a lower-limit current at which belt slip does not occur when an oil pressure in the primary oil chamber falls below a lower-limit oil pressure in the primary oil chamber at which the belt slip does not occur; and a pump control step of driving the oil pump by using the current command value to control a piston position of the primary oil chamber.

7 Claims, 7 Drawing Sheets

(51) Int. Cl.
*F16H 57/04* (2010.01)
*F01M 1/02* (2006.01)

(58) Field of Classification Search
USPC .......................................................... 474/28
See application file for complete search history.

(56) References Cited

U.S. PATENT DOCUMENTS

| | | | | |
|---|---|---|---|---|
| 6,243,638 | B1* | 6/2001 | Abo | F16H 61/66254 474/18 |
| 9,074,596 | B2* | 7/2015 | Miyamoto | F04B 49/20 |
| 2002/0037788 | A1* | 3/2002 | Hagiwara | F16H 61/66272 477/46 |
| 2007/0060441 | A1* | 3/2007 | Kim | F16H 61/66254 477/45 |
| 2010/0035721 | A1* | 2/2010 | Rothenbuhler | F16H 61/66272 477/45 |
| 2012/0035009 | A1* | 2/2012 | Mano | F16H 61/66272 474/28 |
| 2012/0259521 | A1* | 10/2012 | Totsuka | F16H 61/02 701/58 |

FOREIGN PATENT DOCUMENTS

| | | |
|---|---|---|
| JP | 2002-340160 A | 11/2002 |
| JP | 2005-180561 A | 7/2005 |
| JP | 2006-090536 A | 4/2006 |
| JP | 2007-263206 A | 10/2007 |
| JP | 2008-240894 A | 10/2008 |
| JP | 2012-219946 A | 11/2012 |
| JP | 2013-170624 A | 9/2013 |
| JP | 2015-140881 A | 8/2015 |

* cited by examiner

CONTINUOUSLY VARIABLE TRANSMISSION AND METHOD FOR CONTROLLING CONTINUOUSLY VARIABLE TRANSMISSION

TECHNICAL FIELD

The present invention relates to a continuously variable transmission and a method for controlling the continuously variable transmission.

BACKGROUND ART

There is disclosed a continuously variable transmission including a hydraulic circuit that includes a first oil pump configured to pump up oil from an oil pan to generate a line pressure and a second oil pump configured to be provided between a primary pulley and a secondary pulley to adjust the oil in/out to/from a primary oil chamber (e.g., JP2008-240894A).

In such the hydraulic circuit, the second oil pump is interposed in a shifting oil passage that communicates the primary pulley with the secondary pulley and is connected to an oil passage to be a line pressure. Herein, the hydraulic circuit can control a speed ratio by controlling the rotation direction of the second oil pump to adjust the oil in/out to/from the primary oil chamber.

The above document discloses only the shift control of setting a target flow rate of hydraulic oil in accordance with a desired speed ratio and controlling the flow rate of the second oil pump so that the flow rate of the hydraulic oil becomes the target flow rate. For that reason, there is room for consideration of other control.

SUMMARY OF INVENTION

According to one embodiment of the present invention, a method for controlling a continuously variable transmission, the method controlling in/out of oil to/from a primary oil chamber by using an oil pump provided in an oil passage between the primary oil chamber and a secondary oil chamber. The method includes a current command value calculation step of calculating a current command value for the oil pump in accordance with an operating state; a pump control step of driving the oil pump by using the current command value to control a piston position of the primary oil chamber; and a current limiting step of limiting the current command value to a lower-limit current at which belt slip does not occur when an oil pressure in the primary oil chamber falls below a lower-limit oil pressure in the primary oil chamber at which the belt slip does not occur.

DESCRIPTION OF EMBODIMENTS

Hereinafter, an exemplary embodiment of the present invention will be explained with reference to the accompanying drawings.

Figure 1:
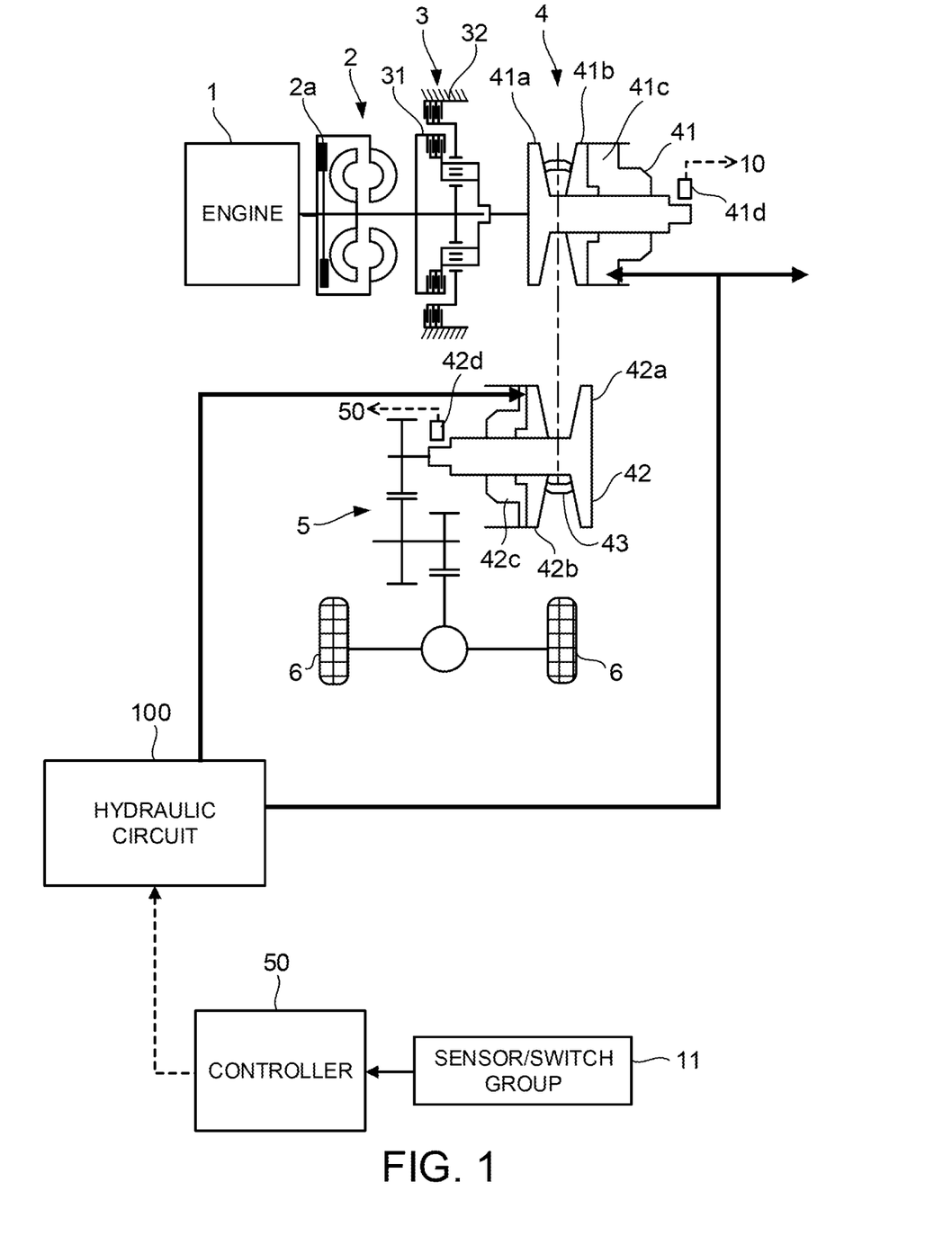
FIG. 1 is a schematic configuration diagram illustrating a vehicle.

FIG. 1 is a schematic configuration diagram illustrating a vehicle according to the present embodiment. The vehicle includes an engine 1, a torque converter 2 with a lock-up clutch 2a, a forward/reverse switching mechanism 3, a variator 4, a final reduction mechanism 5, driving wheels 6, and a hydraulic circuit 100.

The engine 1 constitutes the driving source of the vehicle. The output of the engine 1 is transmitted to the driving wheels 6 via the torque converter 2, the forward/reverse switching mechanism 3, the variator 4, and the final reduction mechanism 5. Therefore, the variator 4 is provided in a power transmission path for transmitting power from the engine 1 to the driving wheels 6, together with the torque converter 2, the forward/reverse switching mechanism 3, and the final reduction mechanism 5.

The forward/reverse switching mechanism 3 is provided between the torque converter 2 and the variator 4 in the above power transmission path. The forward/reverse switching mechanism 3 switches the rotation direction of the input rotation between a forward direction corresponding to forward travel and a reverse direction corresponding to reverse travel.

More specifically, the forward/reverse switching mechanism 3 includes a forward clutch 31 and a reverse brake 32. The forward clutch 31 is engaged when the rotation direction is a forward direction. The reverse brake 32 is engaged when the rotation direction is a reverse direction. The one of the forward clutch 31 and the reverse brake 32 can be configured as a clutch that intermits the rotation between the engine 1 and the variator 4.

The variator 4 includes a primary pulley 41, a secondary pulley 42, and a belt 43 wrapped around the primary pulley 41 and the secondary pulley 42. Hereinafter, primary is also referred to as "PRI" and secondary is also referred to as "SEC". The variator 4 constitutes a belt continuously variable transmission mechanism that changes the wrapping diameters of the belt 43 by changing the groove widths of the PRI pulley 41 and the SEC pulley 42 so as to perform the shift.

The PRI pulley 41 includes a fixed pulley 41a and a movable pulley 41b. A controller 50 activates the movable pulley 41b by controlling the amount of oil to be supplied to a PRI pulley hydraulic chamber 41c so as to change the groove width of the PRI pulley 41.

The SEC pulley 42 includes a fixed pulley 42a and a movable pulley 42b. The controller 50 activates the movable pulley 42b by controlling the amount of oil to be supplied to a SEC pulley hydraulic chamber 42c so as to change the groove width of the SEC pulley 42.

The belt 43 is wrapped around a sheave surface forming a V shape formed by the fixed pulley 41a and the movable pulley 41b of the PRI pulley 41 and a sheave surface forming a V shape formed by the fixed pulley 42a and the movable pulley 42b of the SEC pulley 42.

The final reduction mechanism 5 transmits the output rotation from the variator 4 to the driving wheels 6. The final reduction mechanism 5 is configured to include a plurality of gear trains and a differential gear. The final reduction mechanism 5 rotates the driving wheels 6 via an axle.

The hydraulic circuit 100 supplies an oil pressure to the variator 4, specifically, to the PRI pulley 41 and the SEC pulley 42. The hydraulic circuit 100 also supplies the oil pressure to the forward/reverse switching mechanism 3 and the lock-up clutch 2a, and further to a lubricating system and a cooling system that are not illustrated. The hydraulic circuit 100 is specifically configured as described below.

Figure 2:
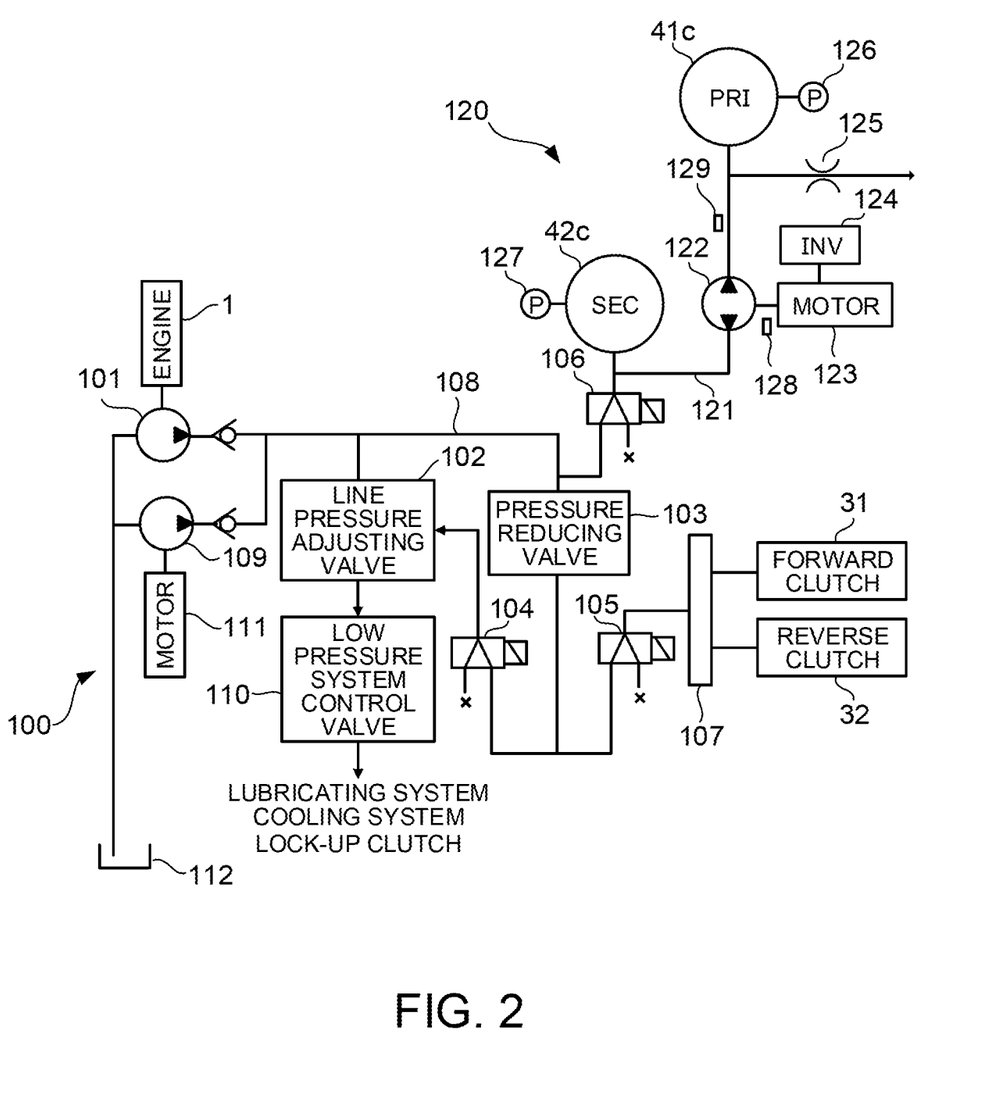
FIG. 2 is a schematic configuration diagram illustrating a hydraulic circuit.

FIG. 2 is a schematic configuration diagram illustrating the hydraulic circuit 100. The hydraulic circuit 100 includes an original pressure oil pump 101, a line pressure adjusting valve 102, a pressure reducing valve 103, a line pressure solenoid valve 104, a forward/reverse switching-mechanism solenoid valve 105, a shifting circuit pressure solenoid valve 106, a manual valve 107, a line pressure oil passage 108, a line-pressure electric oil pump 109, and a low pressure system control valve 110. Hereinafter, a solenoid valve is referred to as "SOL".

The original pressure oil pump 101 is a mechanical oil pump that is driven by the power of the engine 1. The original pressure oil pump 101 is connected to the line pressure adjusting valve 102, the pressure reducing valve 103, and the shifting circuit pressure SOL 106 via the line pressure oil passage 108. The line pressure oil passage 108 constitutes the oil passage for line pressure and is connected to a shift circuit 120 via the shifting circuit pressure SOL 106. In addition, a line pressure is an oil pressure acting as the original pressure of the PRI pressure and the SEC pressure.

The line-pressure electric oil pump 109 is driven by an electric motor 111. The line-pressure electric oil pump 109 is activated to supply a line pressure when the engine 1 is stopped by idling/stop control, for example, and the original pressure oil pump 101 is stopped along with this.

The line pressure adjusting valve 102 adjusts the oil pressure generated by the original pressure oil pump 101 to generate a line pressure. That the original pressure oil pump 101 generates the line pressure includes to generate a line pressure under such the action of the line pressure adjusting valve 102. The oil that the line pressure adjusting valve 102 releases during pressure adjustment is supplied to the lock-up clutch 2a, the lubricating system, and the cooling system via the low pressure system control valve 110.

The pressure reducing valve 103 decreases the line pressure. The oil pressure decreased by the pressure reducing valve 103 is supplied to the line pressure SOL 104 and the forward/reverse switching-mechanism SOL 105.

The line pressure SOL 104 is a linear solenoid valve to generate a control oil pressure according to a control current. The control oil pressure generated by the line pressure SOL 104 is supplied to the line pressure adjusting valve 102, and the line pressure adjusting valve 102 operates in accordance with the control oil pressure generated by the line pressure SOL 104 to perform pressure adjustment. For this reason, the command value of a line pressure PL can be set by the control current to the line pressure SOL 104.

The forward/reverse switching-mechanism SOL 105 is a linear solenoid valve to generate an oil pressure according to a control current. The oil pressure generated by the forward/reverse switching-mechanism SOL 105 is supplied to the forward clutch 31 and the reverse brake 32 via the manual valve 107 activated according to the operation of a driver.

The shifting circuit pressure SOL 106 is a linear solenoid valve to generate an oil pressure to be supplied to the shift circuit 120 in accordance with a control current. For this reason, the command value of a shifting circuit pressure can be set by the control current to the shifting circuit pressure SOL 106. The shifting circuit pressure generated by the shifting circuit pressure SOL 106 is supplied to a shifting oil passage 121 of the shift circuit 120. For example, the shifting circuit pressure may be generated by SOL that generates a control oil pressure according to a control current and a pressure control valve that generates a control circuit pressure from the line pressure PL in accordance with the control oil pressure generated by this SOL.

The shift circuit 120 includes the shifting oil passage 121 connected to the line pressure oil passage 108 via the shifting circuit pressure SOL 106 and a shift oil pump 122 interposed in the shifting oil passage 121. The shifting oil passage 121 communicates the PRI pulley hydraulic chamber 41c with the SEC pulley hydraulic chamber 42c.

The shift oil pump 122 is an electrically operated oil pump that is driven by an electric motor 123. The electric motor 123 is controlled by the controller 50 via an inverter 124. The shift oil pump 122 can switch the rotation direction between forward and reverse directions. Herein, the forward direction is a direction to send oil from the SEC pulley hydraulic chamber 42c side to the PRI pulley hydraulic chamber 41c side and the reverse direction is a direction to send oil from the PRI pulley hydraulic chamber 41c side to the SEC pulley hydraulic chamber 42c side.

When the shift oil pump 122 rotates in the forward direction, oil in the shifting oil passage 121 is supplied to the PRI pulley hydraulic chamber 41c. As a result, the movable pulley 41b of the PRI pulley 41 moves in a direction approaching the fixed pulley 41a, and thus the groove width of the PRI pulley 41 is decreased. On the other hand, the movable pulley 42b of the SEC pulley 42 moves in a direction away from the fixed pulley 42a, and thus the groove width of the SEC pulley 42 is increased. In addition, when the shift oil pump 122 rotates in the forward direction, oil is supplied from the line pressure oil passage 108 to the shifting oil passage 121 so that the oil pressure (hereinafter, also referred to as "SEC-side oil pressure") of the shifting oil passage 121 closer to the SEC pulley hydraulic chamber 42c (hereinafter, also referred to as "SEC side") than the shift oil pump 122 does not fall below the command value of the shifting circuit pressure. The command value of the shifting circuit pressure is set in consideration of preventing the slip of the belt 43, for example. In addition, the oil pressure of the shifting oil passage 121 closer to the PRI pulley hydraulic chamber 41c (hereinafter, also referred to as "PRI side") than the shift oil pump 122 is also referred to as a PRI-side oil pressure.

When the shift oil pump 122 rotates in the reverse direction, oil flows out from the PRI pulley hydraulic chamber 41c. As a result, the movable pulley 41b of the PRI pulley 41 moves in a direction away from the fixed pulley 41a, and thus the groove width of the PRI pulley 41 is increased. On the other hand, the movable pulley 42b of the SEC pulley 42 moves in a direction approaching the fixed pulley 42a, and thus the groove width of the SEC pulley 42 is decreased. Because the oil flowing out from the PRI pulley hydraulic chamber 41c flows into the SEC side, the SEC-side oil pressure is raised. However, the SEC-side oil pressure is controlled not to exceed the command value by the shifting circuit pressure SOL 106. In other words, when the SEC-side oil pressure exceeds the command value, oil is discharged from the shifting oil passage 121 via the shifting circuit pressure SOL 106. On the other hand, when the SEC-side oil pressure is less than the command value, oil flows into from the line pressure oil passage 108 via the shifting circuit pressure SOL 106.

As above, the continuously variable transmission according to the present embodiment performs the shift by controlling the oil in/out to/from the PRI pulley hydraulic chamber 41c by using the shift oil pump 122. The brief of the shift control will be described below.

A branching path branching from between the shift oil pump 122 and the PRI pulley hydraulic chamber 41c is provided in the shifting oil passage 121. Herein, an orifice 125 is provided in the branching path. Oil can be discharged from the orifice 125 to the outside of the shifting oil passage 121. More specifically, the orifice 125 is formed so that its diameter becomes smaller in a portion of the oil passage, and the opposite end of the branching point in the shifting oil passage 121 is opened. Oil continues always leaking out from this open end. When oil is supplied to the PRI pulley hydraulic chamber 41c by the shift oil pump 122, some of oil leaks out from the orifice 125. The oil discharged outside of the shifting oil passage 121 from the orifice is discharged into a space in a case of the continuously variable transmission and is collected in an oil pan 112. As described above, the outside (the tip of the orifice 125) of the shifting oil passage 121 according to the present embodiment is a space. However, the outside (the tip of the orifice 125) of the shifting oil passage 121 may be an oil passage having an oil pressure lower than that of the shifting oil passage 121. In other words, the outside of the shifting oil passage 121 only needs to be a place at which an oil pressure is lower than that of the shifting oil passage 121. In addition, the orifice 125 is an example of an oil discharge mechanism.

Referring again to FIG. 1, the vehicle further includes the controller 50. The controller 50 is an electronic control device and receives signals from a sensor/switch group 11. In addition, the controller 50 is configured by a microcomputer that includes a central processing unit (CPU), a read-only memory (ROM), a random-access memory (RAM), and an input-output interface (I/O interface). The controller 50 may be configured by a plurality of microcomputers.

For example, the sensor/switch group 11 includes an accelerator pedal opening sensor that detects the accelerator pedal opening of the vehicle, a brake sensor that detects the brake pedal force of the vehicle, a vehicle speed sensor that detects a vehicle speed Vsp, and an engine rotation speed sensor that detects a rotation speed NE of the engine 1.

As illustrated in FIG. 2, the sensor/switch group 11 includes a PRI pressure sensor 126 that detects a PRI pressure, a SEC pressure sensor 127 that detects a SEC pressure, a pump rotation speed sensor 128 that detects the rotation speed of the shift oil pump 122, and an oil temperature sensor 129 that detects the temperature of the oil in the shifting oil passage 121. The signals from the sensor/switch group 11 may be input into the controller 50 via another controller, for example. The same is applied to the signals such as information generated by the other controller based on the signals from the sensor/switch group 11.

The controller 50 controls the hydraulic circuit 100 based on the signals from the sensor/switch group 11. More specifically, the controller 50 controls the line pressure SOL 104 and the shift circuit 120 illustrated in FIG. 2. Furthermore, the controller 50 is configured to control the forward/reverse switching-mechanism SOL 105 and the shifting circuit pressure SOL 106.

In controlling the line pressure SOL 104, the controller 50 supplies the control current according to the command value of the line pressure PL to the line pressure SOL 104.

In executing the shift control, the controller 50 sets a target speed ratio based on the signals from the sensor/switch group 11. If the target speed ratio is determined, wrapping diameters (target wrapping diameters) of the pulleys 41 and 42 for realizing the target speed ratio are determined. If the target wrapping diameters are determined, groove widths (target groove widths) of the pulleys 41 and 42 for realizing the target wrapping diameters are determined.

Moreover, in the shift circuit 120, the movable pulley 41b of the PRI pulley 41 moves in accordance with the oil in/out to/from the PRI pulley hydraulic chamber 41c by the shift oil pump 122, and the movable pulley 42b of the SEC pulley 42 also moves according to this. That is to say, the movement amount of the movable pulley 41b of the PRI pulley 41 correlates with the movement amount of the movable pulley 42b of the SEC pulley 42.

Therefore, the controller 50 activates the shift oil pump 122 so that the position of the movable pulley 41b of the PRI pulley 41 becomes a position corresponding to the target speed ratio. The determination of whether the movable pulley 41b is located at a desired position is performed by calculating an actual speed ratio from the detected values of a PRI rotation speed sensor 41d and a SEC rotation speed sensor 42d and determining whether this actual speed ratio is identical with the target speed ratio.

Moreover, that the controller 50 activates the shift oil pump 122 is not limited to the shifting time. Even when the target speed ratio is not changed, the controller 50 activates the shift oil pump 122 when oil leaks out from each of the pulley hydraulic chambers 41c and 42c so as to change the actual speed ratio. In the present embodiment, such the control to maintain the target speed ratio is also included in the shift control.

In other words, the shift control according to the present embodiment is a feedback control for converging the position of the movable pulley 41b of the PRI pulley 41 on a target position. Herein, the control target of this feedback control is not the oil pressures of the pulley hydraulic chambers 41c and 42c but is the groove width of the PRI pulley 41, i.e., the position of the movable pulley 41b.

In addition, a sensor that detects the position of the movable pulley 41b is provided, and this sensor may determine whether the movable pulley 41b is located at a position corresponding to the target speed ratio.

Herein, referring to FIG. 1, a PRI thrust that is a force acting from the PRI pulley 41 and a SEC thrust that is a force acting from the SEC pulley 42 are applied to the belt 43. The PRI thrust is a product of the PRI oil pressure and the cross-sectional area of the PRI pulley 41, and the SEC thrust is a product of the SEC oil pressure and the cross-sectional area of the SEC pulley 42. When the speed ratio of the continuously variable transmission is constant, the PRI thrust is a reaction force whose size is equal to the force transmitted by the SEC thrust via the belt 43.

When the continuously variable transmission downshifts, the PRI pulley 41 moves to the opposite side (right direction in the drawing) to the belt 43, but a relationship between the moving speed of the PRI pulley 41 at that time and a differential thrust FSP obtained by subtracting the PRI thrust from the SEC thrust is expressed by the next equation.

$$FSP = VP/NP \times \text{Constant}$$

Herein, VP is the right moving speed (shift speed) of the PRI pulley 41 and NP is the rotation speed of the PRI pulley 41. In addition, a constant is a value of about 50000.

To shift at a predetermined target shift speed requires a differential thrust corresponding to it. Therefore, when the PRI thrust becomes small to achieve the target shift speed, the PRI thrust falls below the minimum thrust by which belt slip can be suppressed and thus belt slip may occur on the PRI pulley 41 side. In addition, the shift oil pump 122 may be controlled in accordance with operating states such as a target speed ratio and a gain without being limited to a shift speed.

Figure 3:
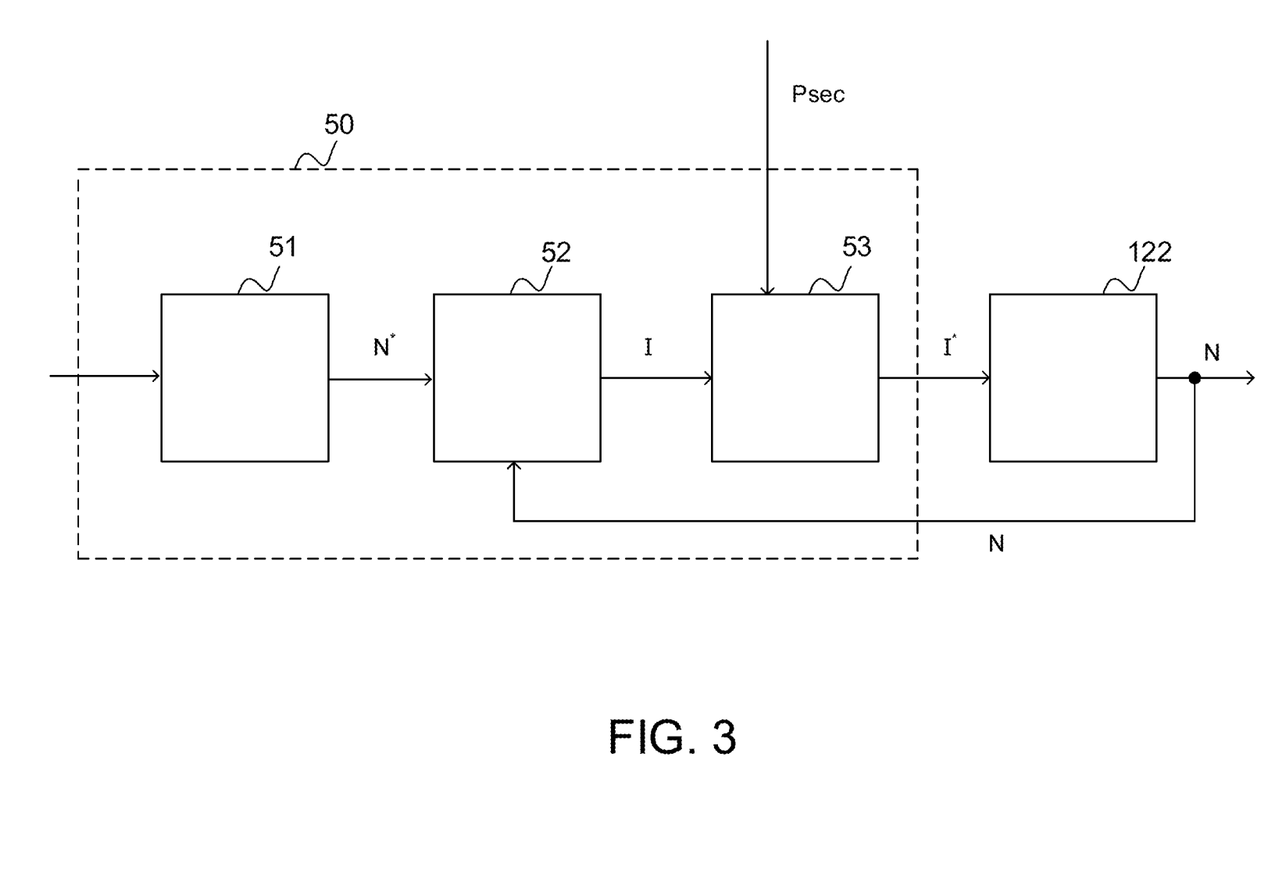
FIG. 3 is a block diagram illustrating the control of a shift oil pump.

FIG. 3 is a block diagram illustrating the control of the shift oil pump 122 according to the present embodiment. In this drawing, blocks 51, 52, and 53 are control blocks and are included in the controller 50. For that reason, the rotational drive of the shift oil pump 122 is controlled by the blocks 51, 52, and 53 included in the controller 50.

The block 51 calculates a rotation-speed command value N* for the shift oil pump 122 based on acquisition values etc. of the sensors. The rotation-speed command value N* is defined by a shift speed according to operating states. For example, because it is required to perform downshifting in a short time in case of rapid acceleration, the rotation-speed command value N* is increased to increase a shift speed.

The rotation-speed command value N* is input into the block 52 and also a rotation speed N is fed back to the block 52 from the shift oil pump 122 as a control target. Then, when calculating a target current I at which the rotation speed N becomes the rotation-speed command value N*, the block 52 outputs the target current I to the block 53.

The block 53 executes a current limiting step and determines whether or not the current limitation is required based on a SEC pressure Psec measured by the SEC pressure sensor 127 with respect to the target current I. Then, when it is determined that the current limitation is required, the block 53 calculates a current command value I* limiting the target current I and outputs the current command value I* to the shift oil pump 122. When it is determined that the current limitation is not required, the block 53 outputs the target current I to the shift oil pump 122 as the current command value I*. For example, the block 53 includes an inverter etc. used for PWM control and can control the electric motor 123 that is driven with AC voltage based on the current command value I*. In addition, because a current used for the drive of the shift oil pump 122 is an alternating current, the current limitation means to limit the absolute value of the alternating current.

In the shift oil pump 122, a rotational drive according to the input of the current command value I* is performed and the rotation speed N becomes an output value. The rotation speed N is fed back to the block 52.

Figure 4:
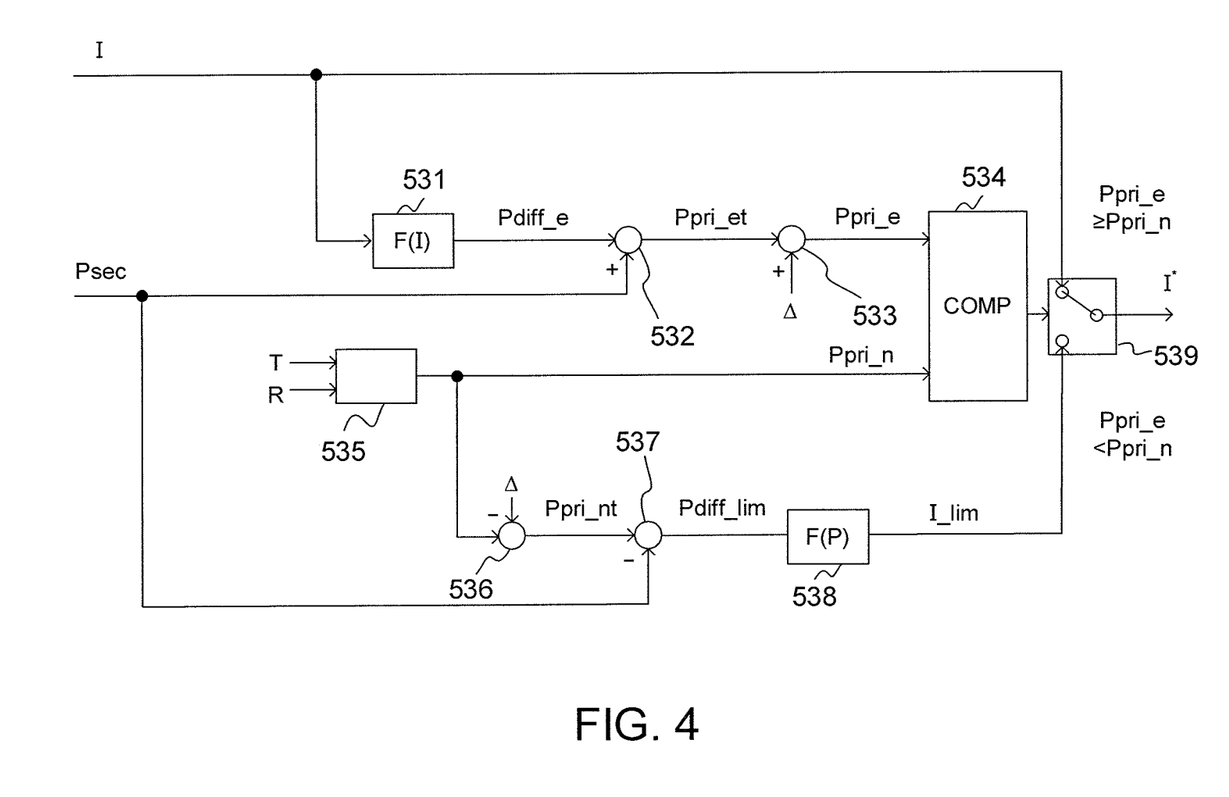
FIG. 4 is a detailed configuration diagram illustrating the execution of a current control step.

FIG. 4 is a detailed configuration diagram of the block 53 that executes the current control step.

A block 531 predicts a between-before-and-after differential pressure of the shift oil pump 122 with respect to the input value of the target current I by using a transfer function F(I) to calculate a predicted differential pressure Pdiff_e. Herein, the transfer function F(I) is a function indicating the characteristics of the shift oil pump 122 and is obtained by modeling the between-before-and-after differential pressure that is an output value with respect to a current value that is an input value. In the transfer function F(I), the between-before-and-after differential pressure is calculated based on oil pump characteristics such as the mechanical efficiency, a specific discharge amount, and a motor torque constant of the shift oil pump 122 in accordance with the target current I. The details on the transfer function F(I) will be explained later.

An adder 532 adds the predicted differential pressure Pdiff_e calculated by the block 531 to the SEC pressure Psec. Herein, a PRI pressure Ppri is the sum of the SEC pressure Psec and the between-before-and-after differential pressure in the shift oil pump 122. The adder 532 outputs the addition result to an adder 533 as a predicted PRI pressure (theoretical value) Ppri_et.

The adder 533 adds a correction value Δ to the predicted PRI pressure (theoretical value) Ppri_et to calculate a predicted PRI pressure Ppri_e and outputs the predicted PRI pressure Ppri_e to a comparator 534. During normal running in which the shift is not performed, a deviation between a predicted value and a measured value of the predicted PRI pressure Ppri_e is previously calculated and the deviation is used as the correction value Δ.

As described above, the predicted PRI pressure Ppri_e that is one input into the comparator 534 is calculated by the block 531 and the adders 532 and 533. Next, the calculation of a required PRI pressure Ppri_n that is the other input into the comparator 534 will be explained.

A block 535 calculates, as the required PRI pressure Ppri_n, the lower-limit oil pressure of the PRI pulley 41 at which no belt slip occurs based on an engine torque T and a speed ratio R indicating the operating states. In addition, the block 535 stores therein a table in which the experimentally obtained lower limit pressures are listed, and calculates the required PRI pressure Ppri_n by using the table. The block 535 outputs the calculated required PRI pressure Ppri_n to the comparator 534 and further to a subtractor 536.

In addition, the rotation speed of the PRI pulley 41 and the rotation speed of the SEC pulley 42 are acquired by rotation speed sensors (not illustrated) provided in the PRI pulley 41 and the SEC pulley 42, and the speed ratio R is calculated depending on a ratio between these rotation speeds. Moreover, when a sensor that detects the position of the movable pulley 41b of the PRI pulley 41 is provided, the speed ratio R may be calculated depending on the position of the movable pulley 41b detected by this sensor.

Next, a calculation method of a lower limit current value I_lim used for executing the current limitation will be explained.

The subtractor 536 subtracts the correction value Δ from the required PRI pressure Ppri_n to calculate a required PRI pressure (theoretical value) Ppri_nt.

A subtractor 537 subtracts the SEC pressure Psec from the required PRI pressure (theoretical value) Ppri_nt to calculate a lower-limit differential pressure Pdiff_lim before and after the shift oil pump 122. Because the possibility of occurrence of belt slip is low when the differential pressure of the shift oil pump 122 exceeds the lower-limit differential pressure Pdiff_lim, the shift oil pump 122 is limited so that the differential pressure does not fall below the lower-limit differential pressure Pdiff_lim. In addition, the lower-limit differential pressure Pdiff_lim is used for the calculation of the lower limit current value of a differential pressure that does not cause the belt slip.

A block 538 calculates the lower limit current value I_lim according to the input of the lower-limit differential pressure Pdiff_lim by using a transfer function F(P). Herein, the transfer function F(P) is a function indicating the characteristics of the shift oil pump 122 and is obtained by modeling a current value that is an output value with respect to a differential pressure that is an input value. In addition, because the input and output of the transfer function F(P) are opposite to those of the transfer function F(I) in the block 531, the transfer function of the transfer function F(I) is an inverse function.

The comparator 534 compares the predicted PRI pressure Ppri_e with the required PRI pressure Ppri_n and outputs the comparison result to a switch 539.

The comparison result by the comparator 534, the target current I, and the lower limit I_lim of the current are input into the switch 539. The switch 539 outputs any one of the target current I or the lower limit current value I_lim based on the comparison result.

More specifically, when the predicted PRI pressure Ppri_e is equal to or more than the required PRI pressure Ppri_n (Ppri_e≥Ppri_n), the switch 539 determines that the current limitation is not required because there is no possibility of occurrence of belt slip and outputs the target current I as the current command value I*. On the other hand, when the predicted PRI pressure Ppri_e is less than the required PRI pressure Ppri_n (Ppri_e<Ppri_n), the switch 539 determines that the belt slip may occur and outputs the lower limit current value I_lim as the current command value I* to limit a current.

Herein, the correction using the correction value Δ in the adder 533 and the subtractor 536 will be explained.

First, the addition process of the correction value Δ performed by the adder 533 will be explained. Because the predicted PRI pressure Ppri_e input into the comparator 534 is a predicted value, it is preferable that the predicted PRI pressure is a high-accuracy predicted value to which a disturbance factor etc. are further added. For that reason, the higher-accuracy predicted PRI pressure Ppri_e can be calculated by adding the correction value Δ to the predicted PRI pressure (theoretical value) Ppri_et calculated by the block 531 by using the adder 533.

Next, the subtraction process of the correction value Δ performed by the subtractor 536 will be explained. The required PRI pressure Ppri_n used for the calculation of the lower limit current value I_lim is calculated based on experimental results in the block 535. However, because a disturbance factor is included in the experimental results, it is preferable to remove the disturbance factor. For that reason, the disturbance factor can be removed by subtracting the correction value Δ from the required PRI pressure Ppri_n by using the subtractor 536.

Herein, the transfer functions F(P) and F(I) indicating the characteristics of the electric oil pump used for the calculation in the blocks 531 and 538 will be explained. As described above, because F(P) is the inverse function of F(I), only F(I) will be explained later.

It is known that the electric motor 123 has the following characteristics.

$$\text{Torque (N·m)} = \text{Motor torque constant (N·m/A)} \times \text{Motor current (A)} \times \text{Motor efficiency (\%)} \quad (1)$$

As indicated in Equation (1), a torque generated from the electric motor 123 is proportional to the flowing current. In addition, the motor efficiency indicates conversion efficiency until a torque generated by energization is transmitted to a mechanical rotation drive torque.

Moreover, it is known that the shift oil pump 122 has the following characteristics.

$$\text{Torque (N·m)} = \text{Unit conversion factor} \times \text{OP specific discharge amount (cc/rev)} \times \text{OP differential pressure (N/m}^2\text{)/OP mechanical efficiency (\%)} \quad (2)$$

Herein, the OP specific discharge amount is an amount of oil discharged per one rotation of the oil pump.

As indicated in Equation (2), a torque generated from the shift oil pump 122 can be calculated by multiplying a unit conversion factor by a product of the specific discharge amount and the between-before-and-after differential pressure. Typically, the mechanical efficiency of the pump is used to calculate the discharge amount of oil by multiplying it by the generated torque. For that reason, a division by the mechanical efficiency is performed in the right side of Equation (2).

The following equation can be calculated from Equation (1) and Equation (2).

$$\text{OP differential pressure} = \text{Motor torque constant} \times \text{Motor current} \times \text{Motor efficiency} \times \text{OP mechanical efficiency/Unit conversion constant} \times \text{OP specific discharge amount} \quad (3)$$

Herein, because only the motor current is a variable and the others are a constant in Equation (3), it turns out that that the OP differential pressure is proportional to the motor current. Therefore, in the block 531, the predicted differential pressure Pdiff_e can be calculated in accordance with the target current I by using the transfer function F(I) corresponding to Equation (3).

Next, a calculation method of the required PRI pressure Ppri_n in the block 535 will be explained. The required PRI pressure Ppri_n that is the lower limit pressure at which no belt slip occurs is calculated by the next equation.

$$\text{Required PRI pressure Ppri}\_n = \text{Engine torque } T \times \cos\theta / (2 \times \text{Belt friction coefficient} \times \text{Element running radius}) \quad (4)$$

Herein, θ is a pulley sheave angle and is a constant determined by the shape of the pulley. The belt friction coefficient is uniquely determined in accordance with the materials of a belt, a pulley, etc. Moreover, the element running radius is obtained as a function according to the speed ratio R. For that reason, Equation (4) indicates that the required PRI pressure Ppri_n is determined in accordance with the engine torque T and the speed ratio R. Therefore, in the block 535, based on Equation (4), the required PRI pressure Ppri_n can be obtained on the basis of the inputs of the engine torque T and the speed ratio R.

In addition, although the required PRI pressure Ppri_n is set to a lower limit at which no belt slip occurs based on Equation (4), the required PRI pressure may be set to have a margin from the lower limit. Similarly, the lower limit current I_lim may also have a margin.

Moreover, in the course of obtaining the predicted PRI pressure Ppri_e, the SEC pressure Psec is used in the adder 532. Herein, because the control of the SEC pulley 42 employs hydraulic feedback control, the SEC pressure Psec does not largely deviate from a target oil pressure. Because the SEC pressure Psec has small error as described above, the SEC pressure can be used for the calculation of the predicted PRI pressure Ppri_e.

Figure 5:
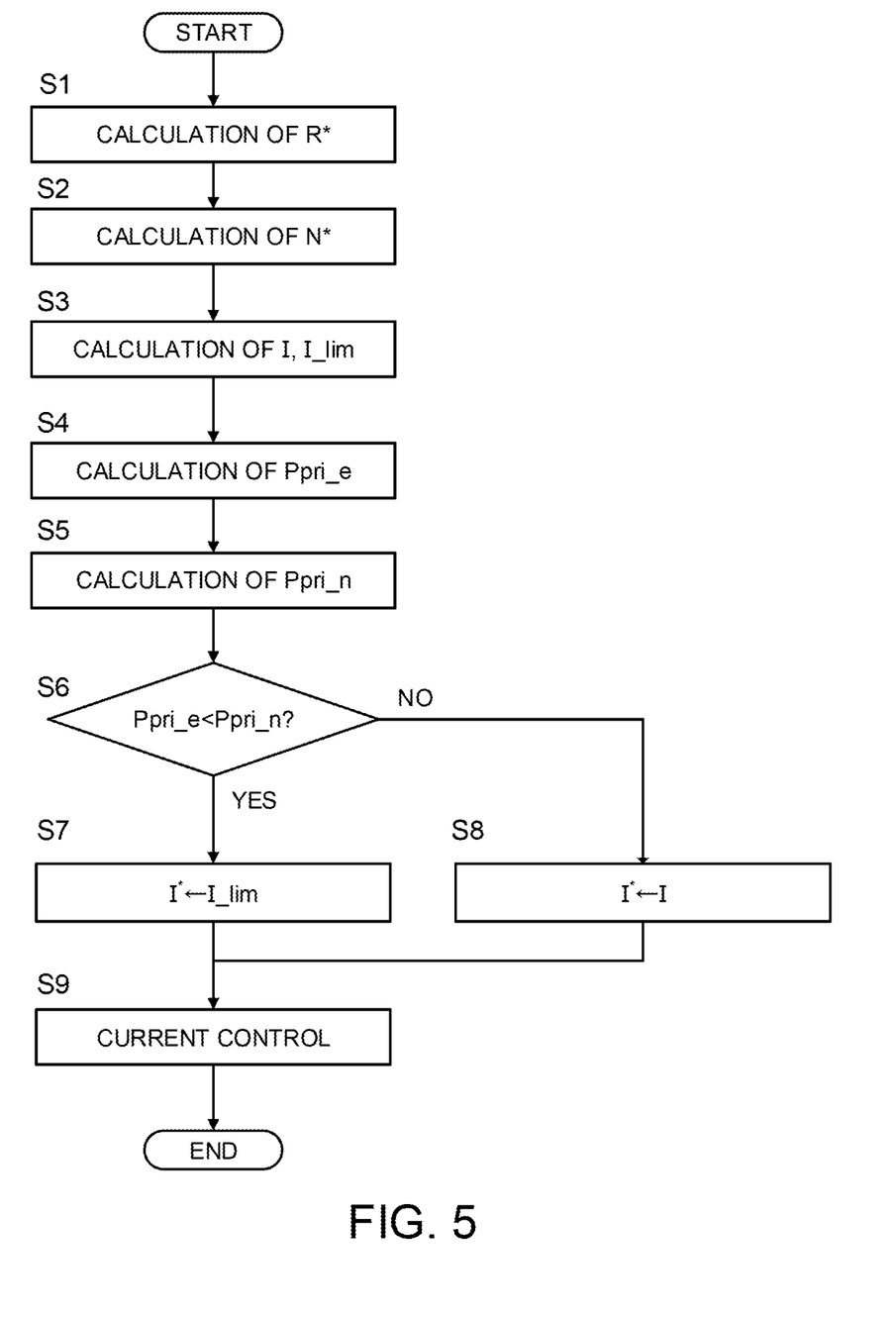
FIG. 5 is a flowchart illustrating the control process of a continuously variable transmission.

FIG. 5 is a flowchart illustrating the control process of the continuously variable transmission that is executed by the controller 50. In addition, this control is repeatedly performed at predetermined intervals.

In Step S1, the block 51 illustrated in FIG. 3 calculates a target speed ratio R* based on the operating states according to the detected values of the sensors.

In Step S2, the block 51 further obtains a shift speed based on the target speed ratio R* calculated in Step S1 and calculates the rotation-speed command value N* for the shift oil pump 122 in accordance with the shift speed. Then, the rotation-speed command value N* is output to the block 52.

In Step S3, the block 52 calculates a difference between the rotation-speed command value N* obtained in Step S2 and the motor rotation speed N of the shift oil pump 122 measured by the pump rotation speed sensor 128. Then, the block 52 calculates the target current I for the shift oil pump 122 based on the difference.

Furthermore, the block 53 performs the process by the block 535, the subtractors 536 and 537, and the block 538 illustrated in FIG. 4 to calculate the lower limit current value I_lim.

In Step S4, the predicted PRI pressure Ppri_e is calculated by performing the process by the block 531 and the adders 532 and 533.

In Step S5, the required PRI pressure Ppri_n is calculated by performing the process by the block 535.

In Step S6, the comparison between the predicted PRI pressure Ppri_e and the required PRI pressure Ppri_n is performed by the comparator 534.

When the predicted PRI pressure Ppri_e is smaller than the required PRI pressure Ppri_n (S6: Yes, Ppri_e<Ppri_n), the block 53 proceeds to the process of Step S7. On the other hand, when the predicted PRI pressure Ppri_e is equal to or more than the required PRI pressure Ppri_n (S6: No, Ppri_e≤Ppri_n), the block 53 proceeds to the process of Step S8.

In Step S7, the current limiting step is executed to set the lower limit current value I_lim as the current command value I*.

In Step S8, the target current I is set as the current command value I*.

In Step S9, a pump control step is executed to control the shift oil pump 122 by using the current command value I* set in Step S7 or S8 as illustrated in FIG. 3.

The blocks 51 and 52 correspond to a current command value calculating unit, and the process from Steps S1 to S3 performed by these blocks corresponds to a current command value calculation step. Moreover, the block 53 corresponds to a current limiting unit that executes the current limiting step. Moreover, an inverter etc. included in the controller 50 correspond to a pump control unit to execute the pump control step.

Figure 6:
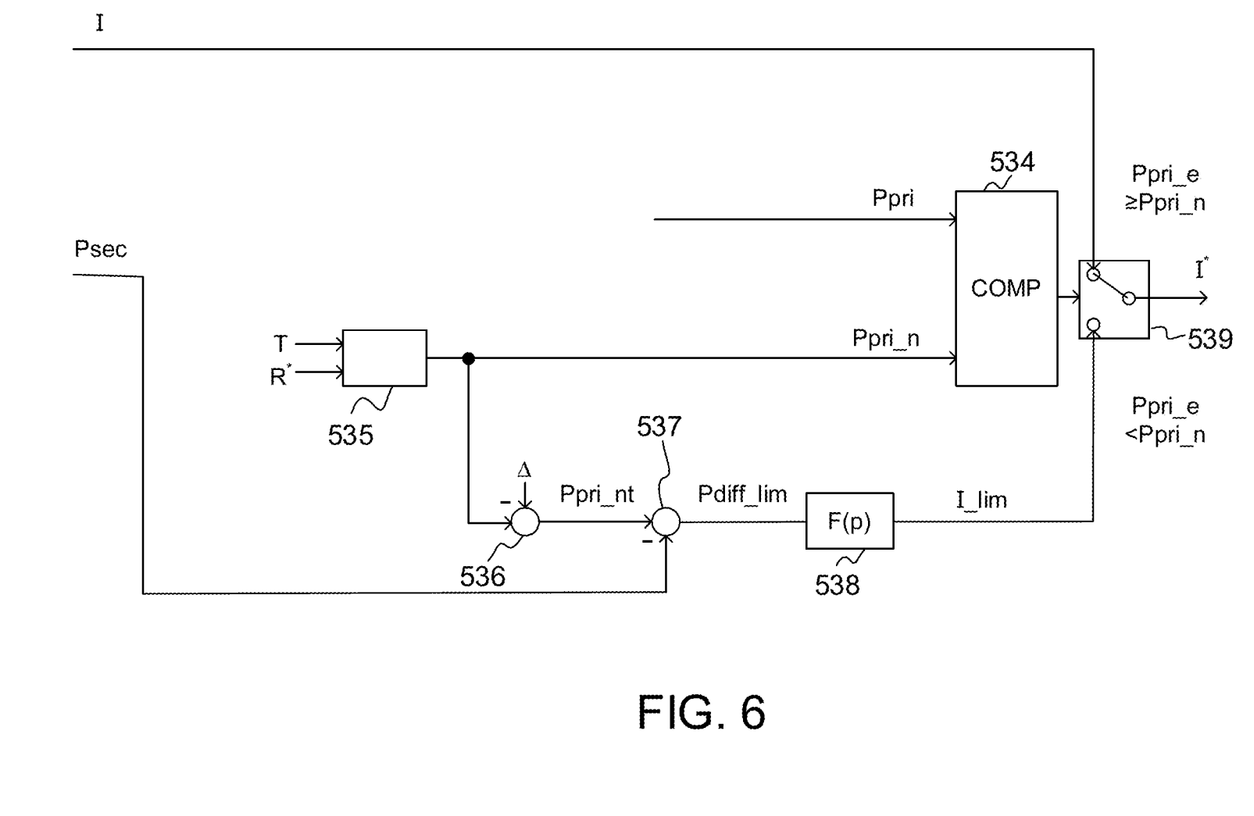
FIG. 6 is a block diagram illustrating another example of the control of the shift oil pump.

Moreover, the comparison process (S6) performed by the comparator 534 may use an actual measured value without using the predicted PRI pressure Ppri_e. For example, like a modified example illustrated in FIG. 6, the PRI pressure Ppri measured by the PRI pressure sensor 126 may be input into the comparator 534. By doing like this, the process in the controller 50 can be reduced.

Figure 7:
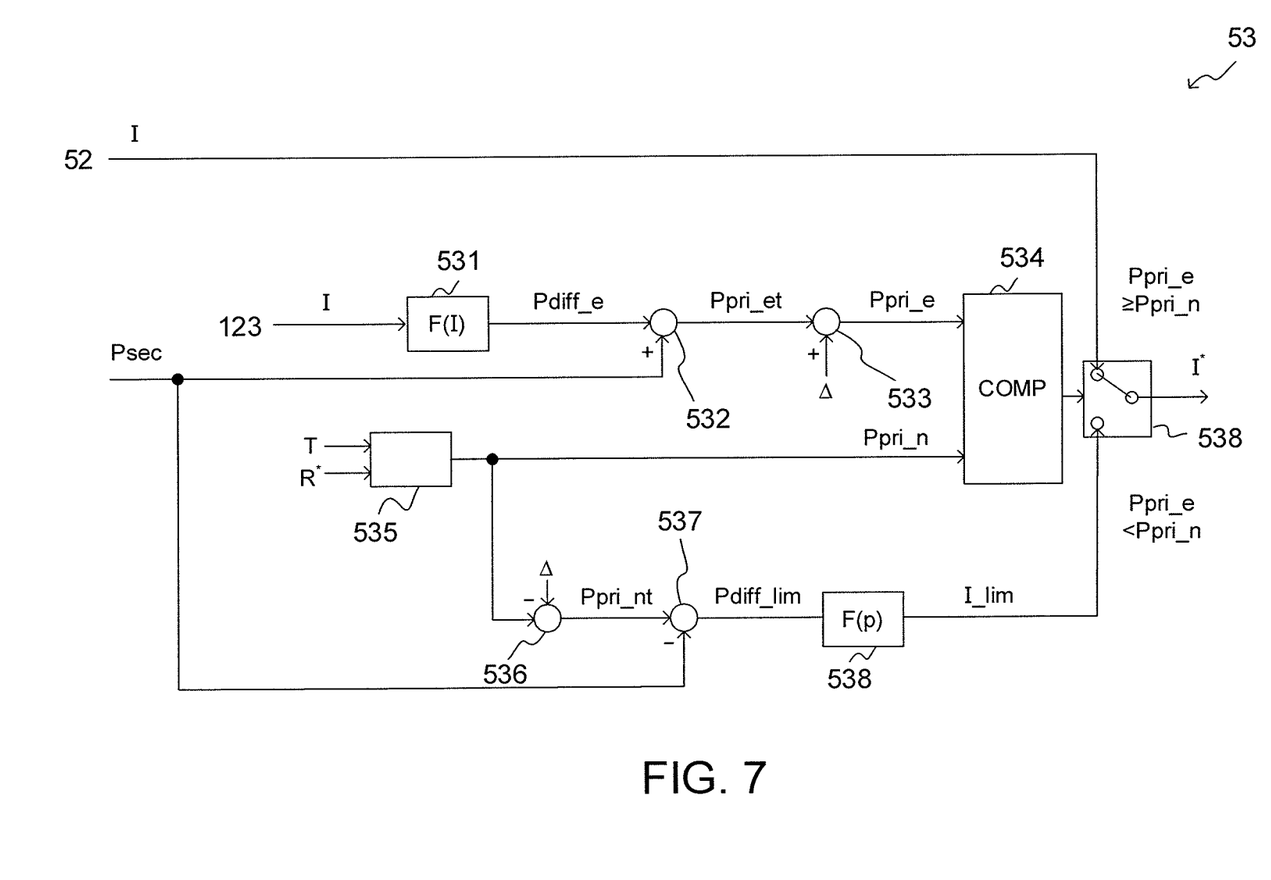
FIG. 7 is a block diagram illustrating further another example of the control of the shift oil pump.

Moreover, the current input into the block 531 is not limited to the target current I calculated by the block 52. For example, like a modified example illustrated in FIG. 7, the block 53 may be configured so that a current actually flowing in the motor 123 is detected by a current sensor etc. and the detected value of this current is input into the block 531.

According to the present embodiment, the following effects can be obtained.

According to the present embodiment, there is performed the current command value calculation step (S1 to S3) of calculating a current command value for the shift oil pump in accordance with a shift speed.

Herein, the SEC thrust propagating from the SEC pulley 42 and the PRI thrust caused by the oil pressure of the PRI pulley 41 are working on the belt 43. A larger differential thrust is required when a shift speed is increased. Therefore, because the PRI thrust is controlled to be much smaller than the SEC thrust, the PRI thrust falls below the minimum thrust that can suppress the belt slip and thus the belt slip may occur in the PRI pulley 41.

In the present embodiment, when the PRI pressure Ppri falls below the required PRI pressure Ppri_n that is the lower limit of the PRI pressure at which no belt slip may occur (S6: Yes), the current limiting step (S7) is executed. By doing so, the current command value I* is limited to the lower-limit current at which no belt slip occurs.

Because the rotation of the shift oil pump 122 is suppressed when the pump control step (S9) of controlling the shift oil pump 122 is executed by using the current command value I* limited in this way, the take-out amount of oil from the PRI pulley 41 becomes small and the decrease of the oil pressure is suppressed, and thus the PRI thrust becomes difficult to be decreased. Therefore, because the PRI thrust does not greatly exceed the SEC thrust, the occurrence of the belt slip can be suppressed.

According to the present embodiment, in the current limiting step, the predicted PRI pressure Ppri_e is predicted (S4) and the predicted PRI pressure Ppri_e is compared with the required PRI pressure Ppri_n (S6).

Herein, when the actual PRI pressure Ppri is compared with the required PRI pressure Ppri_n, there is a possibility that the suppression of the belt slip cannot be completed in time due to the delay of a hydraulic control even if the current limiting step (S9) is performed. More specifically, when a downshifting speed is fast and the current limitation is performed, the suppression of the decrease in the PRI pressure Ppri may not be performed immediately after the start of the current limitation due to the response delay of the oil pressure. For that reason, the PRI pressure Ppri falls below the required PRI pressure Ppri_n and the belt slip may occur.

However, in the present embodiment, because the occurrence of the belt slip is preliminarily predicted by using the predicted PRI pressure Ppri_e, the impact of the response delay of the oil pressure can be made smaller and thus the occurrence of the belt slip can be surely suppressed. Moreover, because the shift oil pump 122 is not wastefully driven, it is possible to optimize the operation of the shift oil pump 122.

According to the present embodiment, in the prediction process (S4) of the predicted PRI pressure Ppri_e, the process of adding a differential pressure generated before and after the shift oil pump 122 to the SEC pressure Psec is performed by the adder 532. As described above, because the SEC pressure Psec is subjected to the hydraulic feedback control and does not largely deviate from a target oil pressure, it is only sufficient to predict the predicted differential pressure Pdiff_e. Therefore, because the predicted PRI pressure Ppri_e can be obtained with high precision, the occurrence of the belt slip can be surely suppressed.

According to the present embodiment, in the current limiting step, in the block 531, the predicted PRI pressure (theoretical value) Ppri_et is calculated by using the target current I and the transfer function F(I) obtained by modeling the shift oil pump 122. In the transfer function F(I), the characteristics of the shift oil pump 122 and the electric motor 123 such as a motor torque constant, motor efficiency, OP mechanical efficiency, and an OP specific discharge amount are used as indicated by Equation (3). In this way, because the predicted PRI pressure (theoretical value) Ppri_et can be predicted with high precision, the occurrence of the belt slip can be surely suppressed.

According to the present embodiment, the correction of adding the correction value Δ to the predicted PRI pressure (theoretical value) Ppri_et calculated by the adder 532 is performed in the current limiting step. This correction value Δ is a difference between a predicted value and a measured value when the shift process is not performed and is caused by a disturbance. Because a disturbance factor can be removed by performing the correction using the correction value Δ, the prediction accuracy of the predicted PRI pressure Ppri_e is improved and thus the occurrence of the belt slip can be more surely suppressed.

In addition, it goes without saying that the present invention is not limited to the above embodiment and various modifications can be made within the scope of the technical idea described in the claims.

The invention claimed is:

1. A method for controlling a continuously variable transmission, the method controlling in/out of oil to/from a primary oil chamber by using an oil pump provided in an oil passage between the primary oil chamber and a secondary oil chamber, the method comprising:
   a current command value calculation step of calculating a current command value for the oil pump in accordance with an operating state;
   a pump control step of driving the oil pump by using the current command value to control a piston position of the primary oil chamber; and
   a current limiting step of limiting the current command value to a lower-limit current at which belt slip does not occur when an oil pressure in the primary oil chamber falls below a lower-limit oil pressure in the primary oil chamber at which the belt slip does not occur, wherein
   the current limiting step includes:
   predicting a predicted oil pressure in the primary oil chamber when the oil pump is activated with the current command value and limiting the current command value to the lower-limit current when the predicted oil pressure falls below the lower-limit oil pressure; and
   performing a correction by using at least one of a predicted differential pressure obtained by a transfer function or a deviation between a predicted value and a measured value in the predicting the predicted oil pressure in the primary oil chamber when the oil pump is activated with the current command value.

2. The method for controlling the continuously variable transmission according to claim 1, wherein the current command value calculation step includes calculating the current command value for the oil pump in accordance with the operating state and a fed-back actual rotation speed of the oil pump.

3. The method for controlling the continuously variable transmission according to claim 1, wherein the predicted oil pressure is corrected based on a deviation between a predicted value and a measured value of the oil pressure in the primary oil chamber when shift is not performed.

4. A method for controlling a continuously variable transmission, the method controlling in/out of oil to/from a primary oil chamber by using an oil pump provided in an oil passage between the primary oil chamber and a secondary oil chamber, the method comprising:
   a current command value calculation step of calculating a current command value for the oil pump in accordance with an operating state;
   a pump control step of driving the oil pump by using the current command value to control a piston position of the primary oil chamber; and
   a current limiting step of limiting the current command value to a lower-limit current at which belt slip does not occur when an oil pressure in the primary oil chamber falls below a lower-limit oil pressure in the primary oil chamber at which the belt slip does not occur, wherein
   the current limiting step includes predicting a predicted oil pressure in the primary oil chamber when the oil pump is activated with the current command value and limiting the current command value to the lower-limit current when the predicted oil pressure falls below the lower-limit oil pressure, and
   the predicted oil pressure is calculated based on an oil pressure in the secondary oil chamber and a between-before-and-after differential pressure generated before and after the oil pump in which a current of the current command value flows.

5. The method for controlling the continuously variable transmission according to claim 4, wherein the between-before-and-after differential pressure is calculated based on the current command value and a characteristic of the oil pump.

6. A control device for a continuously variable transmission comprising:
   a primary oil chamber;
   a secondary oil chamber;
   an oil pump provided in an oil passage between the primary oil chamber and the secondary oil chamber; and
   a controller configured to control the oil pump to control in/out of oil to/from the primary oil chamber,
   the controller comprising:
   a current command value calculating unit configured to calculate a current command value for the oil pump in accordance with an operating state;
   a pump control unit configured to drive the oil pump by using the current command value to control a piston position of the primary oil chamber; and
   a current limiting unit configured to limit the current command value to a lower-limit current at which belt slip does not occur when an oil pressure in the primary oil chamber falls below a lower-limit oil pressure in the primary oil chamber at which the belt slip does not occur, wherein
   the current limiting unit:
   predicts a predicted oil pressure in the primary oil chamber when the oil pump is activated with the current command value and limits the current command value to the lower-limit current when the predicted oil pressure falls below the lower-limit oil pressure; and
   performs a correction using at least one of a predicted differential pressure obtained by a transfer function or a deviation between a predicted value and a measured value on the prediction of the predicted oil pressure in the primary oil chamber when the oil pump is activated with the current command value.

7. A control device for a continuously variable transmission comprising:
   a primary oil chamber;
   a secondary oil chamber;
   an oil pump provided in an oil passage between the primary oil chamber and the secondary oil chamber; and
   a controller configured to control the oil pump to control in/out of oil to/from the primary oil chamber,
   the controller comprising:
   a current command value calculating unit configured to calculate a current command value for the oil pump in accordance with an operating state;
   a pump control unit configured to drive the oil pump by using the current command value to control a piston position of the primary oil chamber; and
   a current limiting unit configured to limit the current command value to a lower-limit current at which belt slip does not occur when an oil pressure in the primary oil chamber falls below a lower-limit oil pressure in the primary oil chamber at which the belt slip does not occur, wherein the current limiting unit:
- predicts a predicted oil pressure in the primary oil chamber when the oil pump is activated with the current command value based on an oil pressure in the secondary oil chamber and a between-before-and-after differential pressure generated before and after the oil pump in which a current of the current command value flows; and
- limits the current command value to the lower-limit current when the predicted oil pressure falls below the lower-limit oil pressure.

* * * * *